(12) United States Patent
Yom

(10) Patent No.: US 10,476,628 B2
(45) Date of Patent: Nov. 12, 2019

(54) ADAPTIVE CODING AND MODULATION (ACM) TRANSCEIVER SYSTEM

(71) Applicant: COMTECH SYSTEMS INC., Orlando, FL (US)

(72) Inventor: Dong Yom, Orlando, FL (US)

(73) Assignee: COMTECH SYSTEMS INC., Orlando, FL (US)

( * ) Notice: Subject to any disclaimer, the term of this patent is extended or adjusted under 35 U.S.C. 154(b) by 0 days.

(21) Appl. No.: 16/142,276

(22) Filed: Sep. 26, 2018

(65) Prior Publication Data

US 2019/0165881 A1 May 30, 2019

Related U.S. Application Data

(60) Provisional application No. 62/590,871, filed on Nov. 27, 2017.

(51) Int. Cl.
*H04L 1/00* (2006.01)

(52) U.S. Cl.
CPC .......... *H04L 1/0009* (2013.01); *H04L 1/0003* (2013.01); *H04L 1/0015* (2013.01); *H04L 1/0021* (2013.01)

(58) Field of Classification Search
USPC ........ 370/217, 221, 229, 316; 375/211, 219, 375/222, 227, 229, 259, 260, 267, 295, 375/316; 455/69, 73, 102, 110, 205; 714/746, 748, 759
See application file for complete search history.

(56) References Cited

U.S. PATENT DOCUMENTS

| 5,764,699 A | 6/1998 | Needham et al. |
| 7,191,381 B2 | 3/2007 | Gesbert et al. |
| 7,590,181 B2 | 9/2009 | Awad et al. |
| 7,593,697 B2 | 9/2009 | Zhu et al. |
| 8,707,126 B2* | 4/2014 | Lee .......... H04H 20/51 714/752 |
| 9,071,393 B2 | 6/2015 | Sturkovich et al. |
| 2005/0147177 A1* | 7/2005 | Seo ..... H04B 1/71055 375/267 |
| 2006/0209937 A1* | 9/2006 | Tanaka ..... H04L 1/0003 375/219 |

(Continued)

*Primary Examiner* — Shawkat M Ali
(74) *Attorney, Agent, or Firm* — Tarolli, Sundheim, Covell & Tummino LLP

(57) ABSTRACT

One example includes an ACM transceiver system. An ACM transceiver system includes an ACM controller configured to receive a reported signal-to-noise ratio (SNR) via each of a plurality of return signals corresponding to a respective plurality of transmit signals that were each sequentially previously transmitted from the ACM transceiver system in a respective modulation and coding scheme (MODCOD). The reported SNR via a given one of the plurality of return signals corresponds to the respective one of the plurality of transmit signals. The ACM controller continuously generates an adaptive SNR threshold associated with each of the plurality of MODCODS based on the reported SNR delivered by the received plurality of return signals, and compares the reported SNR with the adaptive SNR threshold of each of the plurality of MODCODS to select one of the plurality of MODCODS for transmission of a next transmit signal.

20 Claims, 7 Drawing Sheets

(56) References Cited

U.S. PATENT DOCUMENTS

| | | | |
|---|---|---|---|
| 2010/0054144 A1* | 3/2010 | Choi | H04L 1/0003 370/252 |
| 2014/0056335 A1* | 2/2014 | Ryu | H04B 7/18519 375/211 |
| 2016/0233979 A1* | 8/2016 | Koike-Akino | H03M 13/1111 |
| 2018/0183545 A1* | 6/2018 | Subramaniam | H04L 1/0045 |
| 2019/0044612 A1* | 2/2019 | Mundra | H04W 64/006 |

* cited by examiner

150

| ACM REFERENCE TABLE ||
|---|---|
| MODCOD INDEX | SNR THRESHOLD |
| 1 | R(1) |
| 2 | R(2) |
| 3 | R(3) |
| ⋮ | ⋮ |
| K-1 | R(K-1) |
| K | R(K) |

152

| ACM TRACKING TABLE ||
|---|---|
| MODCOD INDEX | MAX SNR DIFFERENCE |
| 1 | T(1) |
| 2 | T(2) |
| 3 | T(3) |
| ⋮ | ⋮ |
| K-1 | T(K-1) |
| K | T(K) |

154

| ADAPTIVE ACM TABLE ||
|---|---|
| MODCOD INDEX | SNR THRESHOLD |
| 1 | A(1) |
| 2 | A(2) |
| 3 | A(3) |
| ⋮ | ⋮ |
| K-1 | A(K-1) |
| K | A(K) |

ADAPTIVE CODING AND MODULATION (ACM) TRANSCEIVER SYSTEM

TECHNICAL FIELD

The present disclosure relates generally to communication systems, and specifically to an adaptive coding and modulation (ACM) transceiver system.

BACKGROUND

Wireless communications systems have been implemented for many years to provide long-range communication. Typical wireless communication systems provide for the transmission of data between antennas that have line-of-sight, such that long-range communications typically involve interposing transceivers or repeaters. However, some long-range communications involve scattering of radio frequency (RF) communication waves, such as from the troposphere of Earth's atmosphere (e.g., troposcatter communications). An upper bound of throughput of a data communication system is mainly related to the receive signal-to-noise ratio (SNR). The SNR and the modulation and coding (MODCOD) scheme of the communication system determine the actual throughput and the quality of communication. At a given SNR, if various MODCOD schemes are available, one MODCOD scheme can be selected among them so that the throughput can be maximized while meeting a certain quality requirement. The amount of SNR for the received signal at a receiver can mainly be based on the characteristics of the communication channel, such as propagation loss, multipath fading, and/or a variety of other factors. As an example, in some communications environments, such as for a troposcatter channel communications system, the dynamic fading characteristics of the channel can cause a dynamic change in SNR.

SUMMARY

One example includes an ACM transceiver system. An ACM transceiver system includes an ACM controller configured to receive a reported signal-to-noise ratio (SNR) via each of a plurality of return signals corresponding to a respective plurality of transmit signals that were each sequentially previously transmitted from the ACM transceiver system in a respective modulation and coding scheme (MODCOD). The reported SNR of a given one of the plurality of return signals corresponds to the respective one of the plurality of transmit signals. The ACM controller continuously generates an adaptive SNR threshold associated with each of the plurality of MODCODS based on the reported SNR delivered by the received plurality of return signals, and compares the reported SNR with the adaptive SNR threshold of each of the plurality of MODCODS to select one of the plurality of MODCODS for transmission of a next transmit signal.

Another example includes a method for transmitting signals in an ACM transceiver system. The method includes transmitting a first transmit signal in a first MODCOD of a plurality of MODCODS. The method includes receiving a first return signal corresponding to the first transmit signal and receiving a reported SNR corresponding to the first transmit signal via the first return signal. The method also includes comparing the reported SNR with a plurality of adaptive SNR thresholds in an adaptive ACM table, each of the plurality of adaptive SNR thresholds being associated with a respective one of the plurality of MODCODS, to determine one of the plurality of MODCODS for transmission of a second transmit signal. The method also includes transmitting the second transmit signal via the determined one of the plurality of MODCODS and receiving a second return signal corresponding to the second transmit signal. The method further includes updating the adaptive ACM table based on the reported SNR delivered by the second return signal.

Another example includes a troposcatter communication system comprising an ACM transceiver system. The ACM transceiver system includes an ACM controller configured to receive a reported SNR delivered by each of a plurality of return signals corresponding to a respective plurality of transmit signals that were each sequentially previously transmitted from the ACM transceiver system in a respective one of a plurality of modulation and coding schemes MODCODS. The reported SNR delivered by a given one of the plurality of return signals corresponds to the respective one of the plurality of transmit signals. The ACM controller includes an ACM reference table comprising a nominal SNR threshold associated with each of the plurality of MODCODS, and includes an ACM tracking table comprising a maximum SNR difference value corresponding to a difference between the reported SNR associated with one of the plurality of transmit signals and the reported SNR of another one of the plurality of transmit signals for each of the plurality of MODCODS. The ACM controller further includes an adaptive ACM table comprising an adaptive SNR threshold associated with each of the plurality of MODCODS, the adaptive SNR threshold comprising a sum of the nominal SNR threshold and the maximum SNR difference value for each of the plurality of MODCODS. The ACM controller is configured to compare the reported SNR with the adaptive SNR threshold of each of the plurality of MODCODS to select one of the plurality of MODCODS for transmission of a next transmit signal.

BRIEF DESCRIPTION OF THE DRAWINGS

FIG. 4 illustrates an example diagram of ACM tables.

DETAILED DESCRIPTION

The present disclosure relates generally to communication systems, and specifically to an adaptive coding and modulation (ACM) transceiver system. The ACM transceiver system can be implemented in any of a variety of communication systems, such as a troposcatter communications system in which signals are transmitted to be scattered from the troposphere of Earth's atmosphere. The ACM transceiver system can be implemented to provide for selection of a given modulation and coding (MODCOD) scheme of the transmit signals to adapt to both fast channel and slow channel fading of the transmission medium, such as to adapt to changing weather and/or atmospheric conditions. Therefore, the transmit communications signals can be provided in a MODCOD that is best suited for dynamic changes in the transmission medium conditions.

The ACM transceiver system can include an ACM controller that can be part of an ACM transceiver in the associated communications system. The ACM controller can be configured to receive a reported SNR from a return signal that is associated with a transmit signal that was previously transmitted from the ACM transceiver, such as reported from another transceiver that received that transmit signal and provided the associated return signal. The ACM controller can thus implement the reported SNR and can continuously generate an adaptive SNR threshold associated with each of the plurality of MODCODS, such as stored in an adaptive ACM table, based on the reported SNR delivered by the return signal. The ACM controller can also compare the reported SNR with the adaptive SNR threshold of each of the plurality of MODCODS to select one of the plurality of MODCODS for transmission of a next transmit signal. Because the adaptive SNR threshold is periodically updated based on the reported SNR delivered by the return signals, the ACM controller can respond to fast fading of the communications channel.

As an example, the ACM controller can generate an SNR difference value based on the relative SNR of a first and second transmit signal, and can compare the SNR difference value with the SNR difference value stored in an ACM tracking table for the respective associated MODCOD. If the SNR difference value is greater than the SNR difference value stored in the ACM tracking table for the respective associated MODCOD, the ACM controller can overwrite the SNR difference value stored in the ACM tracking table, and can adjust all of the stored SNR difference values stored in the ACM tracking table by a decay factor. The ACM controller can thus add the SNR difference value to a nominal SNR threshold stored in a reference ACM table to generate the adaptive SNR threshold stored in the adaptive ACM table. As a result, the ACM controller can adaptively respond to both fast and slow fading of the communications channel.

Figure 1:
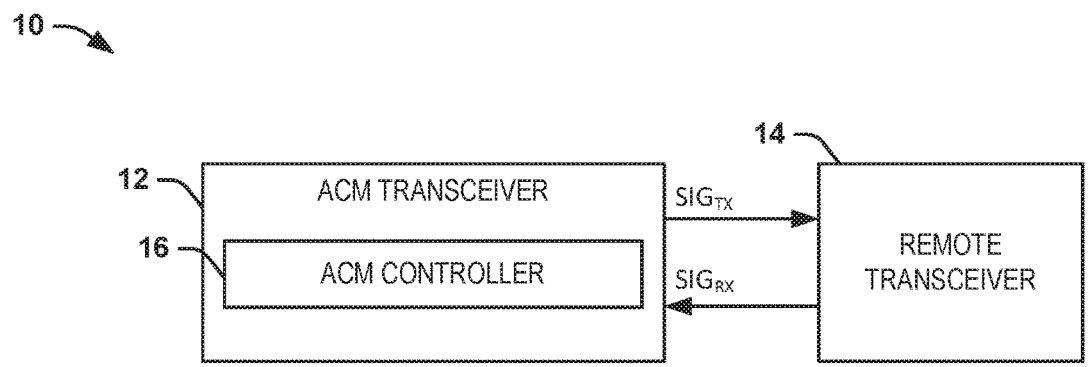
FIG. 1 illustrates an example of an ACM communications system.

FIG. 1 illustrates an example of an adaptive coding and modulation (ACM) communications system 10. The ACM communications system 10 can correspond to any of a variety of wireless communications systems, such as in a troposcatter channel communications system. The ACM communications system 10 includes an ACM transceiver 12 and a remote transceiver 14 that are configured to wirelessly communicate with each other (e.g., via troposcatter communication signals). As an example, the remote transceiver 14 can be configured substantially similarly with respect to the ACM transceiver 12.

The ACM transceiver 12 includes an ACM controller 16. The ACM transceiver 12 is configured to transmit signals, referred to hereinafter as "transmit signals $SIG_{TX}$", that can be provided wirelessly in one of a plurality of modulation and coding (MODCOD) schemes. The ACM controller 16 is configured to select a given one of the MODCOD schemes for transmission of each of the transmit signals $SIG_{TX}$. As an example, the MODCODS can correspond to different modulation and data-rate arrangements of the transmit signals $SIG_{TX}$ that can relate to different SNR threshold values. For example, some of the MODCODS can be better suited to transmission in different transmission medium conditions than others, such as based on different atmospheric conditions for a troposcatter channel communications system. As described in greater detail herein, the ACM controller 16 can be configured to adaptively select the MODCODS based on fast fading of the communications channel, such as to respond to dynamic changes in the transmission medium.

The ACM controller 16 is configured to receive a reported SNR via a return signal, demonstrated in the example of FIG. 1 as "return signals $SIG_{RX}$" that are associated with the transmit signals $SIG_{TX}$. As an example, the reported SNR provided by the return signals $SIG_{RX}$ can each be associated with a time of a respective transmit signal $SIG_{TX}$. In response to receiving the transmit signal $SIG_{TX}$, the remote transceiver 14 can determine the SNR of the received transmit signal $SIG_{TX}$ and can transmit a respective return signal $SIG_{RX}$ back to the ACM transceiver 12 to report the determined SNR. Therefore, the ACM transceiver 12 receives the return signal $SIG_{RX}$ after a given propagation delay associated with transmission of the transmit signal $SIG_{TX}$ from the ACM transceiver 12 to the remote transceiver and the transmission of the return signal $SIG_{RX}$ from the remote transceiver to the ACM transceiver 12. Accordingly, the SNR at the time of the associated transmit signal $SIG_{TX}$ can be available after some delay.

As described previously, the ACM controller 16 can be configured to adaptively select MODCODS for transmission of the transmit signals $SIG_{TX}$. As an example, the ACM controller 16 can be configured to adaptively select the MODCODS based on the SNR associated with the previously transmitted transmit signals $SIG_{TX}$, accounting for the delay of the SNR information, as described in greater detail herein, to compensate for dynamic fading of the communications medium (e.g., changes to atmospheric conditions in a troposcatter channel communications system).

Figure 2:
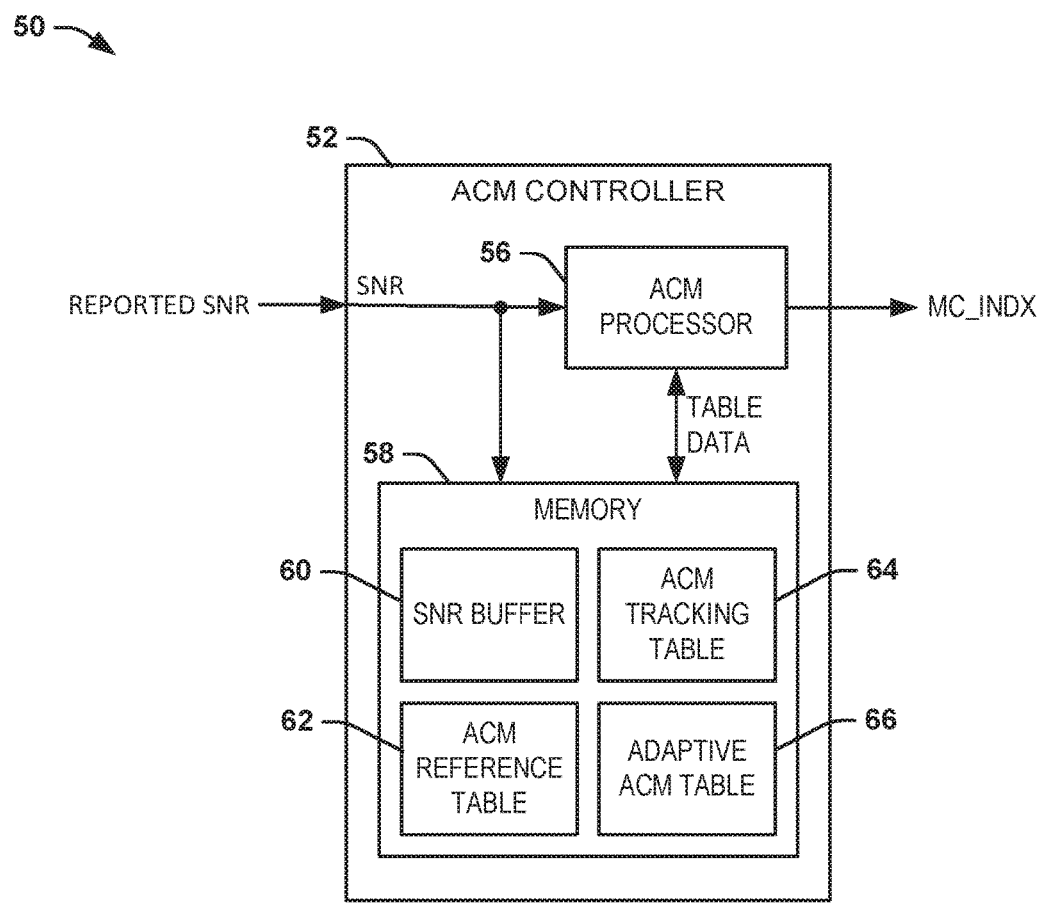
FIG. 2 illustrates another example of an ACM transceiver system.

FIG. 2 illustrates another example of an ACM transceiver system 50. The ACM transceiver system 50 can correspond to the ACM transceiver system 12 in the example of FIG. 1. Therefore, reference is to be made to the example of FIG. 1 in the following description of the example of FIG. 2.

The ACM transceiver system 50 includes an ACM controller 52. As described previously, the ACM controller 52 is configured to adaptively select one of a plurality of MODCODS for transmission of each transmit signal $SIG_{TX}$ (not shown in the example of FIG. 2), such as based on dynamic fading of the communications channel associated with the transmit signals $SIG_{TX}$. As an example, the MODCODS can correspond to different modulation and data-rate arrangements of the transmit signals $SIG_{TX}$ that can relate to different SNR threshold values.

In the example of FIG. 2, the reported SNR is delivered by a given return signal $SIG_{RX}$ that can correspond to a signal transmitted from the remote transceiver 14 in response to a respective transmit signal $SIG_{TX}$. For example, the respective transmit signal $SIG_{TX}$ can have been transmitted from the ACM transceiver system 50 to the remote transceiver 14 at a prior time, such that the ACM transceiver system 50 can receive the return signal $SIG_{TX}$ after a propagation delay associated with transmission of the respective transmit signal $SIG_{TX}$ from the ACM transceiver system 50 to the remote transceiver 14 and associated with transmission of the return signal $SIG_{RX}$ from the remote transceiver 14 to the ACM transceiver system 50. The SNR associated with the respective transmit signal $SIG_{TX}$ can thus be available after some delay, as reported by the remote transceiver 14. The time delay in SNR information flow due to signal propagation delay is demonstrated in the example of FIG. 3.

Figure 3:
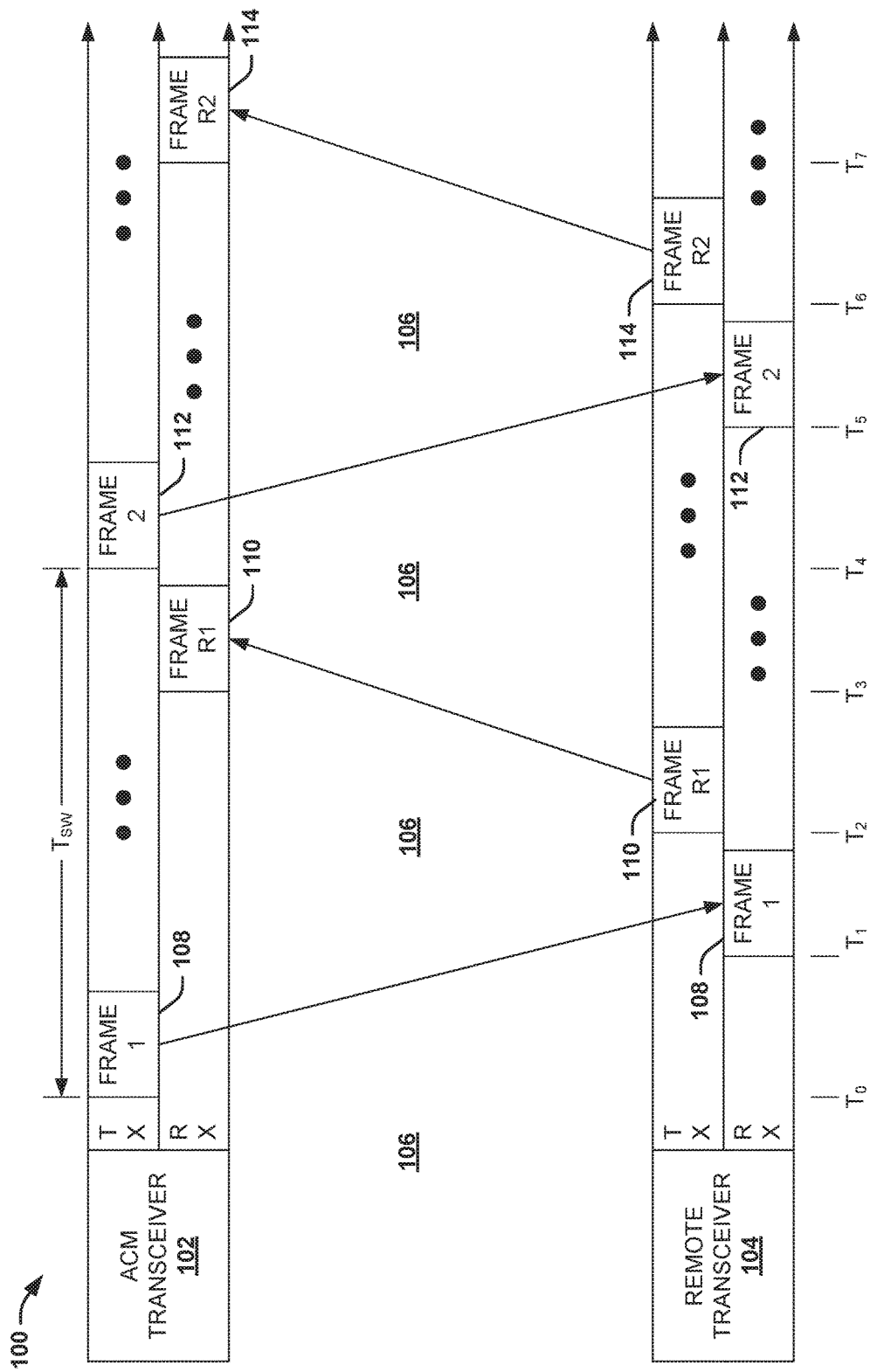
FIG. 3 illustrates an example diagram of signal transfer in an ACM communications system.

FIG. 3 illustrates an example diagram 100 of signal transfer in an ACM communications system. The ACM communications system can correspond to the ACM communications system 10 in the example of FIG. 1. The diagram 100 demonstrates an ACM transceiver 102 and a remote transceiver 104 separated by a transmission medium 106 (e.g., Earth's atmosphere). As an example, the ACM transceiver 102 can correspond to the ACM transceiver 50 in the example of FIG. 2. Therefore, reference is to be made to the example of FIGS. 1 and 2 in the following description of the example of FIG. 3.

Each of the ACM transceiver 102 and the remote transceiver 104 includes a transmit signal stream ("TX") and a receive signal stream ("RX") that are demonstrated as a sequence of signal frames from left to right. In the example of FIG. 3, a first transmit frame 108 ("FRAME 1"), such as corresponding to one of the transmit signals $SIG_{TX}$, is transmitted from the ACM transceiver 102 at a time $T_0$. The first transmit frame 108 can be transmitted in a given one of the MODCODS. The first transmit frame 108 propagates through the transmission medium 106 and is received at the remote transceiver 104 at a time $T_1$. In response to receiving the first transmit frame 108, the remote transceiver 104 can be configured to determine the SNR of the first transmit frame 108 based on the propagation of the first transmit frame 108 through the transmission medium 106. Therefore, the determined SNR can be associated with the transmission medium condition at the time of transmission of the first transmit frame 108.

The remote transceiver 104, in response to determining the SNR of the first transmit frame 108, can transmit a first return frame 110 ("FRAME R1"), such as corresponding to one of the return signals $SIG_{RX}$, at a time $T_2$. The first return frame 110 can include the determined SNR of the first transmit frame 108, as based on the transmission medium condition at the time of the first transmit frame 108, to report the determined SNR to the ACM transceiver 102. The first return frame 110 propagates through the transmission medium 106 and is received at the ACM transceiver 102 at a time $T_3$. The ACM transceiver 102 can thus receive the reported SNR delivered by the first return frame 110, and can store the reported SNR in the SNR buffer 60. As described in greater detail herein, the ACM transceiver 102 can adaptively select MODCODS for subsequent transmissions based on the reported SNR in a manner to accommodate dynamic fading of the channel associated with the communications medium 106.

After receiving the first return frame 110, the ACM transceiver 102 can be configured to transmit a second transmit frame 112 ("FRAME 2") in a respective MODCOD at a time $T_4$. As an example, the MODCOD can be the same MODCOD corresponding to the first transmit frame 108, or can be a different MODCOD based on the adaptive MODCOD selection described herein. In the example of FIG. 3, the time between transmission of the first transmit frame 108 and the second transmit frame 112 is demonstrated as a time duration L in terms of the number of frames, where $L=T_{SW}/T_{FRAME}$. The time duration L can thus correspond to the propagation delay associated with the transmission of the first transmit frame 108 from the ACM transceiver 102 to the remote transceiver 104 and the propagation delay associated with the transmission of the first return frame 110 from the remote transceiver 104 to the ACM transceiver 102.

Similar to as described previously regarding the first transmit frame 108, the second transmit frame 112 propagates through the transmission medium 106 and is received at the remote transceiver 104 at a time $T_5$. In response to receiving the second transmit frame 112, the remote transceiver 104 can be configured to determine the SNR of the second transmit frame 112 based on the propagation of the second transmit frame 112 through the transmission medium 106. Also similar to as described previously, the remote transceiver 104, in response to determining the SNR of the second transmit frame 112, can transmit a second return frame 114 ("FRAME R2") at a time $T_6$. The second return frame 114 can include the determined SNR of the second transmit frame 112, as based on the transmission medium condition at the time of transmission of the second transmit frame, to report the determined SNR to the ACM transceiver 102. The second return frame 114 propagates through the transmission medium 106 and is received at the ACM transceiver 102 at a time $T_7$. The ACM transceiver 102 can thus receive the reported SNR delivered by the second return frame 114.

Referring back to the example of FIG. 2, the reported SNR (demonstrated in the example of FIG. 2 as "SNR") is provided to an ACM processor 56 and a memory 58 that are each associated with the ACM controller 52. The memory 58 is configured to store the reported SNR in an SNR buffer 60. For example, each received return signal $SIG_{RX}$ can provide a respective reported SNR that is stored in the SNR buffer 60 in a chronological or other order, such that each reported SNR can be associated to a respective one of the transmit signals $SIG_{TX}$. The memory 58 also includes an ACM reference table 62, an ACM tracking table 64, and an adaptive ACM table 66 that can be maintained by the ACM controller 52 for performing ACM communication via the transmit signals $SIG_{TX}$.

FIG. 4 illustrates an example diagram 150 of ACM tables. In the example of FIG. 4, the diagram 150 includes an ACM reference table 152, an ACM tracking table 154, and an adaptive ACM table 156. As an example, the ACM reference table 152 can correspond to the ACM reference table 62, the ACM tracking table 154 can correspond to the ACM tracking table 64, and the adaptive ACM table 156 can correspond to the adaptive ACM table 66 in the example of FIG. 2. Therefore, reference is to be made to the examples of FIGS. 1 and 2 in the following description of the example of FIG. 4.

Each of the tables 152, 154, and 156 are indexed by a plurality K of MODCODS, where K is a positive integer greater than one. Thus, each of the tables 152, 154, and 156 include a MODCOD index numbering from 1 to K corresponding to each of the respective MODCODS. As an example, the MODCOD indices can correspond to a list of the MODCODS in ascending order of SNR for each of the respective MODCODS in the ACM reference table.

The ACM reference table 152 includes an SNR threshold "R" associated with each of the MODCODS in the MODCOD index. Thus, the SNR thresholds stored in the ACM reference table 152 are demonstrated in the example of FIG. 4 as numbering from R(1) to R(K) corresponding to the respective K MODCODS. The SNR thresholds R(1) through R(K) can correspond to nominal SNR threshold values associated with the MODCODS. As an example, the SNR thresholds stored in the ACM reference table 152 can be static values, and thus do not change in response to changes in the channel conditions (e.g., the transmission medium 106) in the ACM transmission system 100. For example, the ACM reference table 152 can correspond to an SNR threshold table in a typical wireless system that selects MODCODS based on the reported SNR in a non-adaptive manner.

The ACM tracking table 154 includes a maximum SNR difference value "T" associated with each of the MODCODS in the MODCOD index. The maximum SNR difference values are demonstrated in the example of FIG. 4 as numbering from T(1) to T(K) corresponding to the respective K MODCODS. The maximum SNR difference values T(1) through T(K) can correspond to maximum difference values for a given time difference (e.g., in quantity of frames) associated with each of the MODCODS. For example, the ACM controller 52 can update the ACM tracking table 154 in response to determining an SNR difference value between the reported SNR at a prior time and the reported SNR at the current time being greater than the maximum SNR difference value "T" for the MODCOD associated with the current reported SNR, such that the ACM controller 52 can overwrite the maximum SNR difference value "T" with the SNR difference value. As a result, the ACM tracking table 154 can be implemented to maintain the maximum SNR difference value for the associated MODCOD.

In addition, the ACM controller 52 can periodically adjust the maximum SNR difference values T(1) through T(K) in the ACM tracking table 154 to account for slow fading of the communications channel (e.g., the communications medium 106). For example, in response to receiving each of the return signals $SIG_{RX}$, the ACM controller 52 can be configured to adjust the maximum SNR difference values T(1) through T(K) by a decay factor having a value that is less than one. As a result, each of the maximum SNR difference values T(1) through T(K) decreases gradually to eventually ensure that each of the maximum SNR difference values T(1) through T(K) is updated to account for slow fading of the communication channel and also to prevent anomalous SNR difference values from persisting indefinitely.

The adaptive ACM table 156 includes an SNR threshold "A" associated with each of the MODCODS in the MODCOD index. Thus, the SNR thresholds stored in the adaptive ACM table 156 are demonstrated in the example of FIG. 4 as numbering from A(1) to A(K) corresponding to the respective K MODCODS. The SNR thresholds A(1) through A(K) can be adaptive SNR thresholds that change in response to changes in the communications channel (e.g., transmission medium 56 in the example of FIG. 2). For example, the SNR thresholds A(1) through A(K) can correspond to a sum of the nominal SNR threshold values R(1) through R(L) and the maximum SNR difference values T(1) through T(K), respectively, stored in the respective ACM reference table 152 and the ACM tracking table 154. Accordingly, the ACM controller 52 can implement the adaptive ACM table 156 to select a MODCOD for a next transmit signal $SIG_{TX}$ to be transmitted from the ACM transceiver 50.

In addition, as described previously, the MODCOD indices can correspond to a list of the MODCODS in ascending order of SNR for each of the respective MODCODS. Because the adaptive ACM table 156 can have SNR thresholds A(1) through A(K) corresponding to a sum of the nominal SNR threshold values R(1) through R(L) and the maximum SNR difference values T(1) through T(K), selective individual SNR thresholds A(1) through A(K) can change in response to receiving the return signals $SIG_{RX}$. As a result, some of the SNR thresholds A(1) through A(K) can be changed to have values that are greater than a value corresponding to the next higher MODCOD index, thus resulting in the list of MODCODS no longer being arranged in ascending order of SNR. In response, the ACM controller 52 can overwrite a given one of the adaptive SNR thresholds A(1) through A(K) with the sum of a minimum SNR increment and the adaptive SNR threshold of a preceding MODCOD index value in response to the given one of the adaptive SNR thresholds being less than the sum of the minimum SNR increment and the adaptive SNR threshold of a preceding MODCOD index value. Accordingly, the ascending order of SNR for each of the respective MODCODS can be preserved.

Referring back to the example of FIG. 2, the ACM controller 52 can implement the adaptive MODCOD selection based on a difference of the reported SNR between two separate transmit signals $SIG_{TX}$, as stored in the SNR buffer 60, such as the first and second transmit frames 108 and 112 in the example of FIG. 3. For example, the ACM controller 52 can generate an SNR difference value corresponding to the difference between the reported SNR values of the separate transmit signals $SIG_{TX}$. The ACM controller 52 can thus compare the SNR difference value with the maximum SNR difference value "T" that is stored in the ACM tracking table 64 for the respective associated MODCOD. If the SNR difference value of the reported SNR values is greater than the maximum SNR difference value stored in the ACM tracking table 64 for the respective associated MODCOD, the ACM controller 52 can overwrite the SNR difference value that is stored in the ACM tracking table 64, and can add the new maximum SNR difference value to the SNR threshold of the ACM reference table 62 to provide a new SNR threshold in the adaptive ACM table 66 (e.g., while preserving the ascending order of MODCODS, similar to as described previously in the example of FIG. 4). Otherwise, the ACM controller 52 can disregard the SNR difference value.

As described previously, the ACM processor 56 receives the reported SNR delivered by each of the return signals $SIG_{RX}$. After potentially updating the maximum SNR difference value in the ACM tracking table 64, and thus the SNR threshold in the adaptive ACM table 66, the ACM processor 56 can compare the reported SNR with the SNR thresholds in the adaptive ACM table 66. In response to determining the appropriate MODCOD index based on the relative value of the reported SNR with the SNR thresholds, the ACM processor 56 provides a signal MC_INDX corresponding to the appropriate MODCOD, such as to a modulator (not shown) to facilitate modulation of the next transmit signal $SIG_{TX}$ in the appropriate MODCOD. As a result, the ACM transceiver 50 can provide adaptive selection of MODCODS for transmitting signals in an optimal manner to accommodate dynamic fading of the communications channel.

Figure 5:
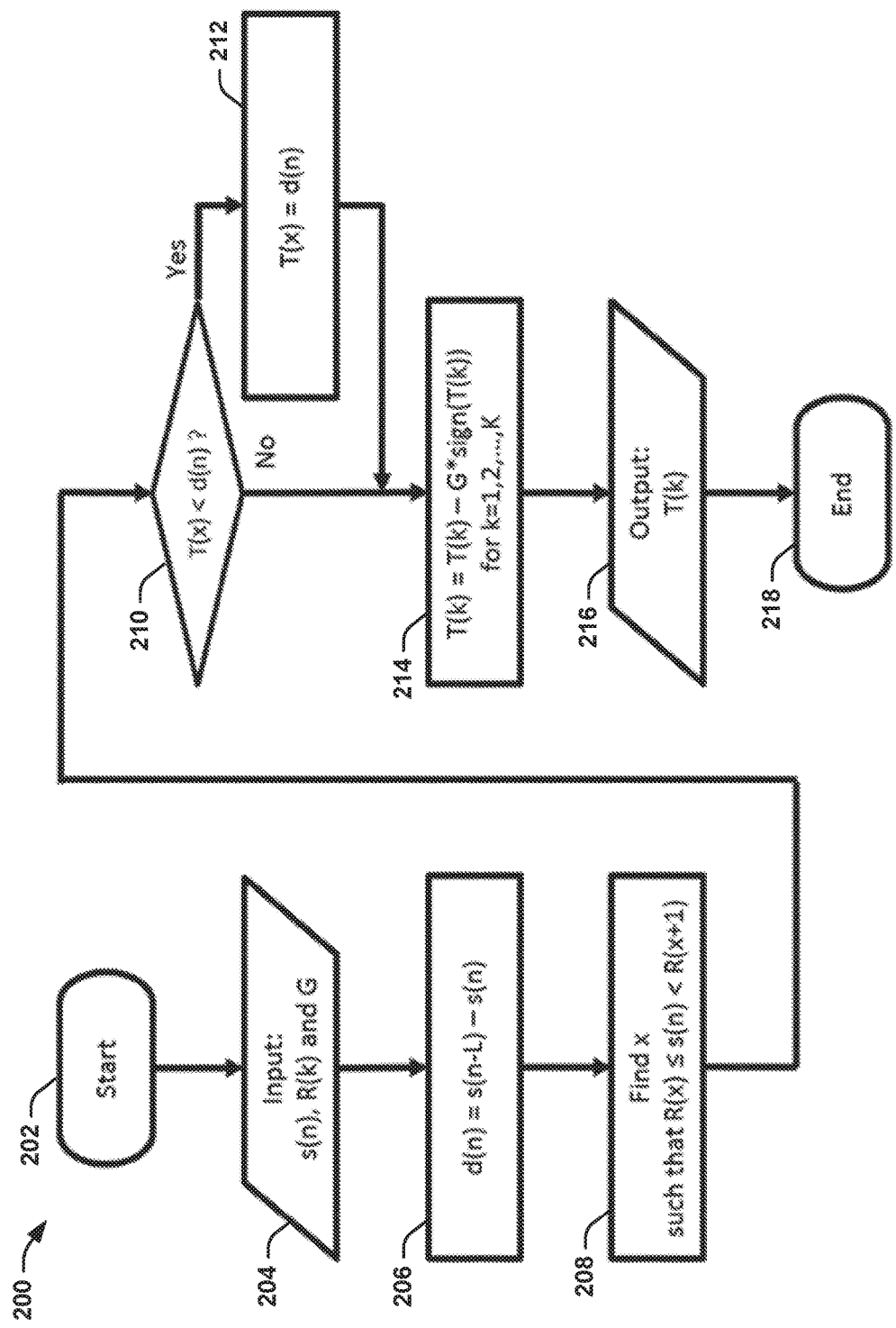
FIG. 5 illustrates an example flow diagram of updating an ACM tracking table.
Figure 6:
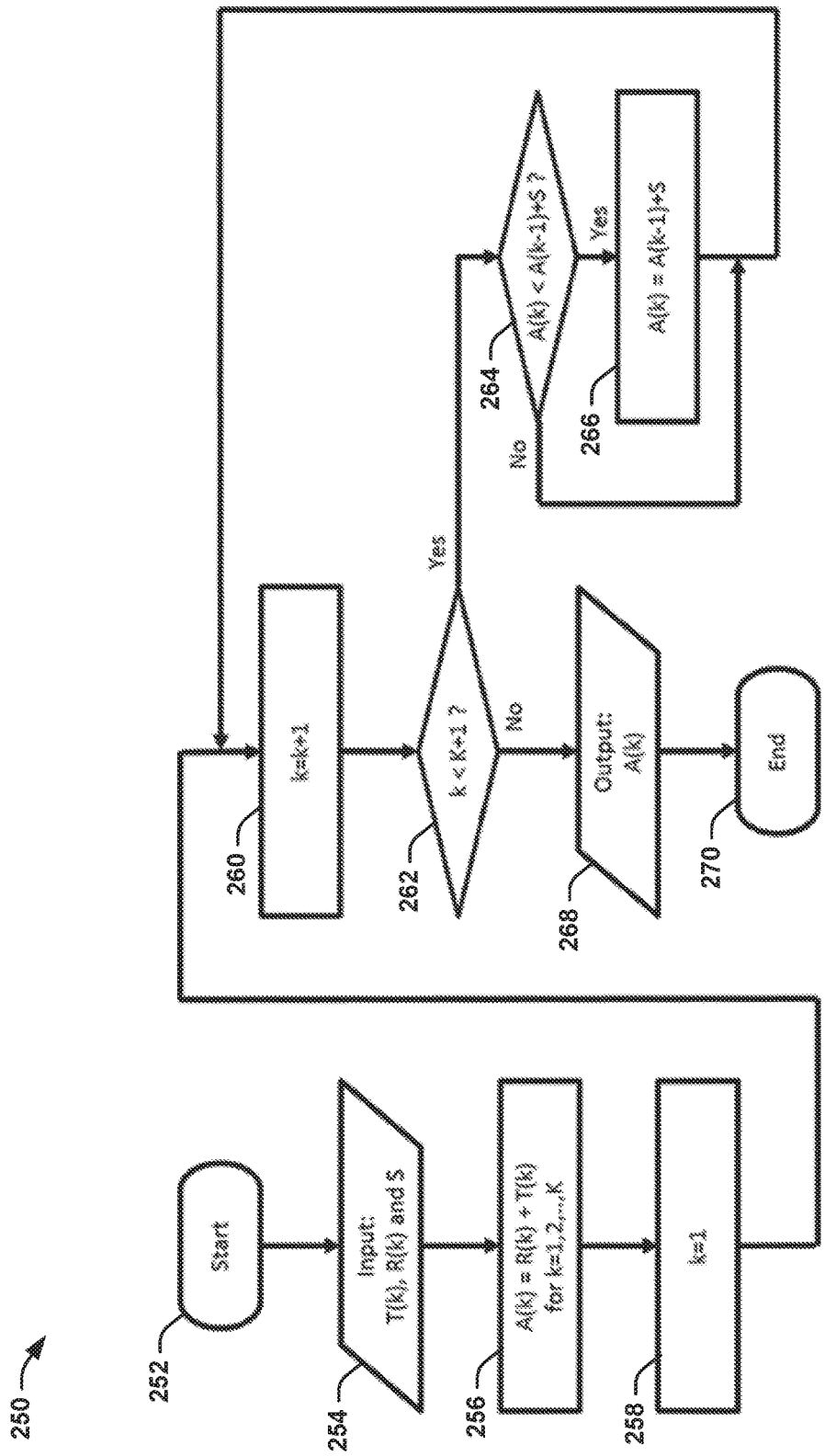
FIG. 6 illustrates an example flow diagram of updating an adaptive ACM table.
Figure 7:
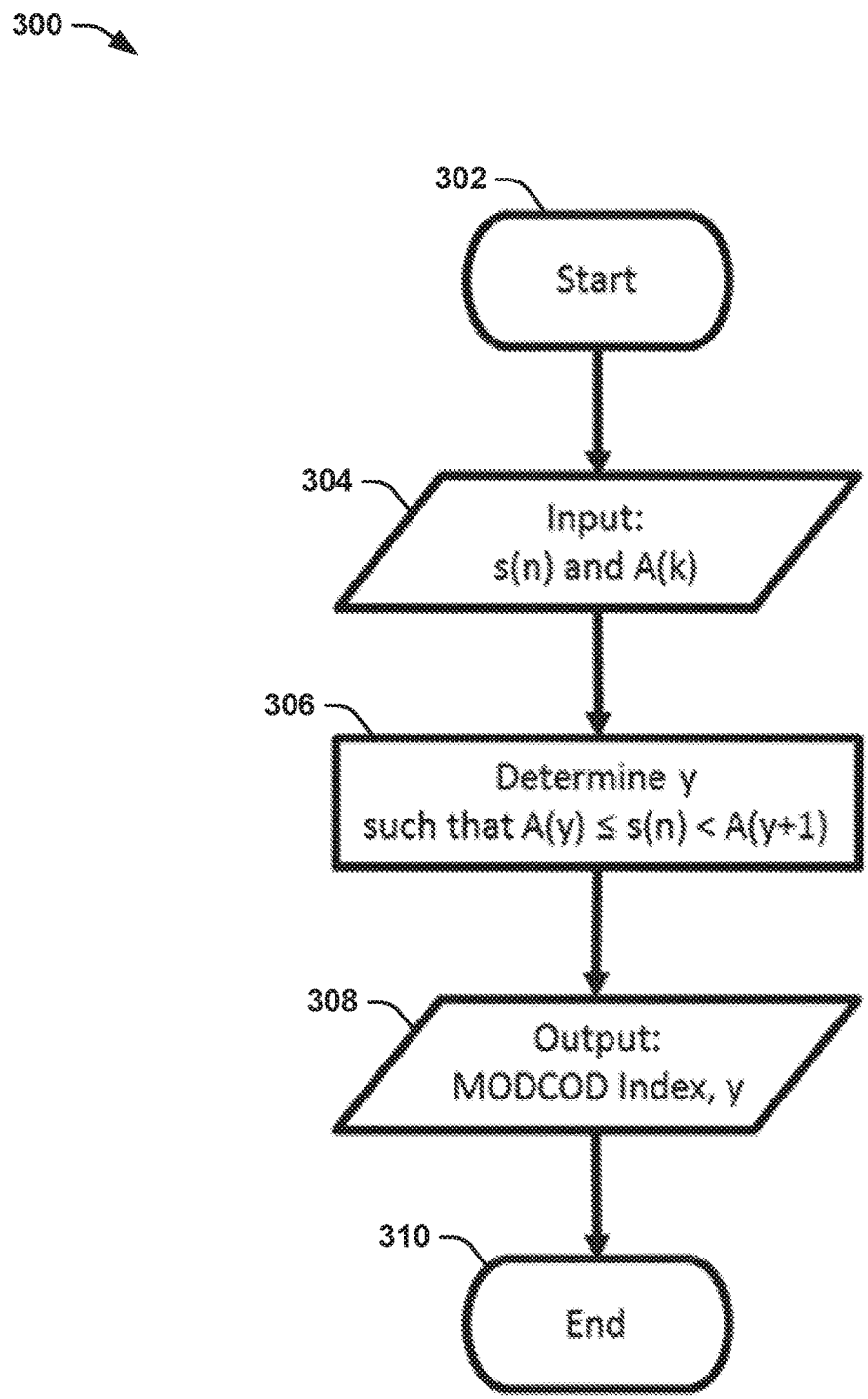
FIG. 7 illustrates an example flow diagram of selecting a MODCOD index.

In view of the foregoing structural and functional features described above, methodologies in accordance with various aspects of the present disclosure will be better appreciated with reference to FIGS. 5-7. While, for purposes of simplicity of explanation, the methodologies of FIGS. 5-7 are shown and described as executing serially, it is to be understood and appreciated that the present disclosure is not limited by the illustrated orders, as some aspects could, in accordance with the present invention, occur in different orders and/or concurrently with other aspects from that shown and described herein. Moreover, not all illustrated features may be required to implement the methodologies in accordance with an aspect of the present disclosure.

FIG. 5 illustrates an example flow diagram 200 of updating an ACM tracking table, such as the ACM tracking tables 64 and 154 in the respective examples of FIGS. 2 and 4. Therefore, reference is to be made to the example of FIGS. 1-4 in the following description of the example of FIG. 5.

The diagram 200 starts at 202, such as in response to receiving a given return signal $SIG_{RX}$. At 204, the ACM processor 56 inputs parameters s(n), R(k), and G. The parameter s(n) is the reported SNR at the nth receive frame of the given return signal $SIG_{RX}$, R(k) is the SNR threshold of the ACM reference table 62 for the kth MODCOD index, and G is the decay parameter, 0<G<<1 (e.g., 0.1). At 206, the ACM processor 56 calculates the parameter d(n), where d(n) corresponds to the difference between the current reported SNR value and the previous (L-frame earlier) reported SNR value. At 208, the ACM processor 56 determines the MOD-COD index which is associated with the current reported SNR value using the ACM reference table.

At 210, the ACM processor 56 determines if the maximum SNR difference value T(x) for the respective associated MODCOD is less than the SNR difference value d(n). For example, the maximum SNR difference value T(k) for each MODCOD can initially be set to zero. If the maximum SNR difference value T(x) for the respective associated MODCOD is less than the SNR difference value d(n), then at 212, the ACM processor 56 overwrites the maximum SNR difference value T(x) with the SNR difference value d(n) and the diagram proceeds to 214. If the maximum SNR difference value T(x) for the respective associated MODCOD is greater than or equal to the SNR difference value d(n), then the diagram proceeds to 214. At 214, the ACM processor 56 adjusts each of the maximum SNR difference values T(1) through T(K) by the decay factor G. At 216, the ACM processor 56 outputs the maximum SNR difference values T(k) for all of the MODCODs, such as to the process of updating the adaptive ACM table 66, as described in greater detail herein. The diagram ends at 218.

FIG. 6 illustrates an example flow diagram 250 of updating an adaptive ACM table, such as the adaptive ACM tables 66 and 156 in the respective examples of FIGS. 2 and 4. Therefore, reference is to be made to the example of FIGS. 1-5 in the following description of the example of FIG. 6.

The diagram 250 starts at 252, such as in response to updating the ACM tracking table. At 254, the ACM processor 56 inputs parameters T(k), R(k), and S. The parameter S corresponds to the minimum SNR increment (e.g., 0.2). At 256, the ACM processor 56 calculates the adaptive SNR threshold A(k) for each respective MODCOD k by adding the maximum SNR difference value T(k) to the SNR threshold R(k). The ACM processor 56 then maintains the ascending SNR order of the MODCODS beginning at 258. At 258, the ACM processor 56 sets the value of MODCOD index k=1 and proceeds to 260 at which k=k+1.

At 262, the ACM processor 56 determines if k<K+1, and thus determines if all of the k MODCOD indices have been cycled through in the algorithm. If k is less than K+1, then the ACM processor 56 proceeds to 264 at which the ACM processor 56 determines if the SNR threshold of the adaptive ACM table 66 for the kth MODCOD index is less than the SNR threshold of the adaptive ACM table 66 for the previous (e.g., k−1) MODCOD index plus the minimum SNR increment value S. If the ACM processor 56 determines that the SNR threshold of the adaptive ACM table 66 for the kth MODCOD index is less than the SNR threshold of the adaptive ACM table 66 for the previous (e.g., k−1) MODCOD index plus the minimum SNR increment value S, then the ACM processor 56 proceeds to 266. At 266, the ACM processor 56 sets the SNR threshold of the kth MODCOD index in the adaptive ACM table 66 to be equal to the SNR threshold of the adaptive ACM table 66 for the previous (e.g., k−1) MODCOD index plus the minimum SNR increment value S. The ACM processor 56 then returns to 260, which also occurs if the ACM processor 56 determines that the SNR threshold of the adaptive ACM table 66 for the kth MODCOD index is not less than the SNR threshold of the adaptive ACM table 66 for the previous (e.g., k−1) MODCOD index plus the minimum SNR increment value S.

In response to the ACM processor 56 determining that k=K+1, and thus determines that all of the k MODCOD indices have been cycled through in the algorithm, the ACM processor 56 proceeds to 268 at which the ACM processor 56 outputs the adaptive SNR threshold values A(k) for all of the MODCOD indices, such as to the process of selecting a MODCOD index. The diagram then ends at 270.

FIG. 7 illustrates an example flow diagram 300 of selecting a MODCOD index. The diagram 300 can correspond to selection of the MODCOD index via the ACM processor 56 in the example of FIG. 2. Therefore, reference is to be made to the example of FIGS. 1-6 in the following description of the example of FIG. 7.

The diagram 300 starts at 302, such as in response to updating the adaptive ACM table. At 304, the ACM processor 56 inputs parameters s(n) and A(k), such as from the memory 58 (e.g., from the adaptive ACM table 66). At 306, the ACM processor 56 determines the value "y" corresponding to the MODCOD index in which the reported SNR s(n) has a value between the SNR thresholds A(y) and A(y+1). At 308, the ACM processor 56 outputs the MODCOD index "y" (e.g., MC_INDX) corresponding to the MODCOD index for transmission of the next transmit signal $SIG_{TX}$. At 310, the diagram ends.

Figure 8:
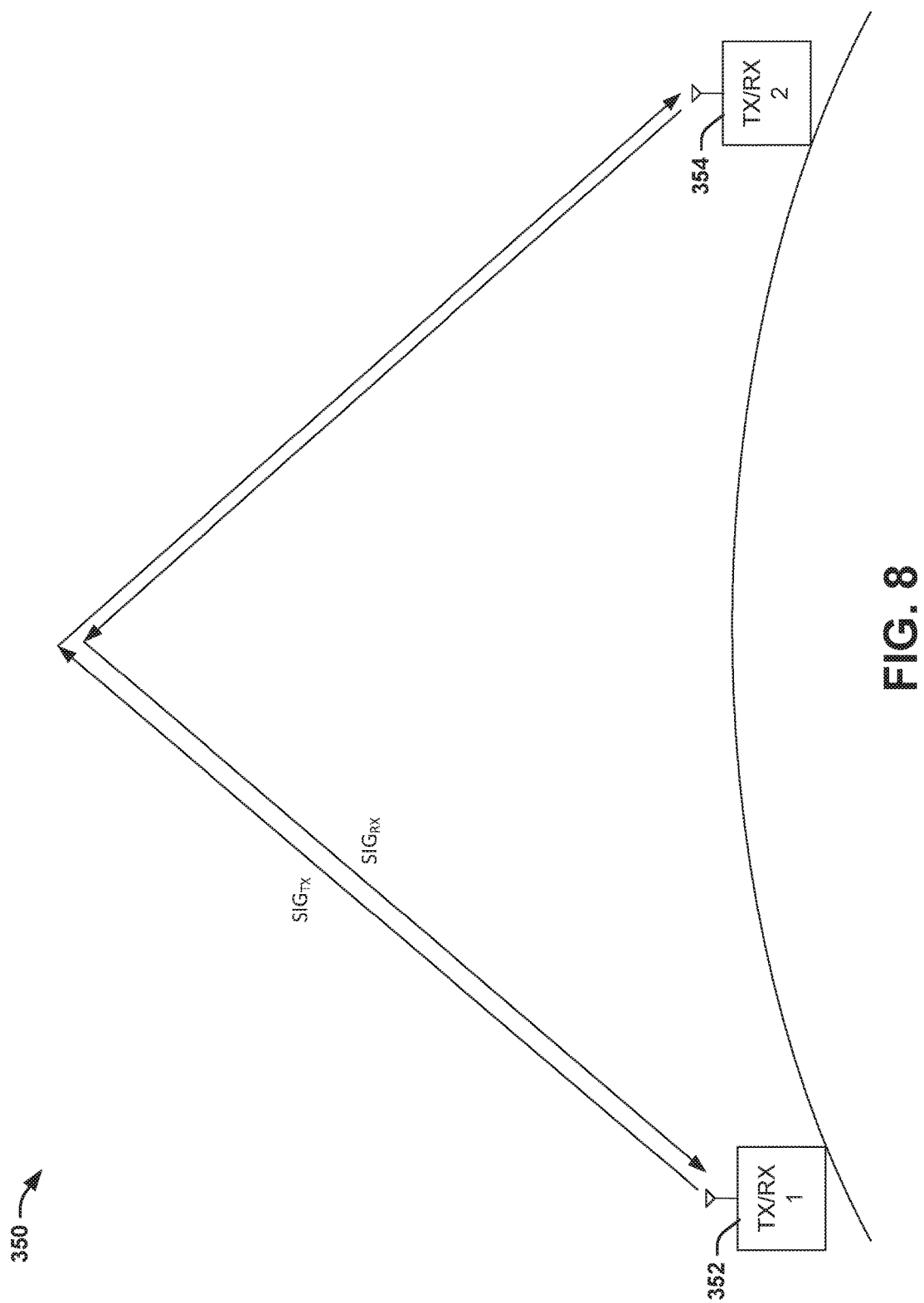
FIG. 8 illustrates an example of a troposcatter communications system.

FIG. 8 illustrates an example of a troposcatter communications system 350. The troposcatter communications system 350 can correspond to any of a variety of wireless communications systems that implement scattering of wireless signals from the troposphere to achieve long-range communications. The troposcatter communications system 350 includes an ACM transceiver 352 ("TX/RX 1") and a remote transceiver 354 ("TX/RX 2") that are configured to wirelessly communicate with each other via troposcatter communication signals. As an example, the remote transceiver 354 can be configured substantially similarly with respect to the ACM transceiver 352.

As an example, the troposcatter communications system 350 can be configured substantially similar to the ACM communications system 10 in the example of FIG. 1. For example, the ACM transceiver 352 can include an ACM controller. The ACM transceiver can transmit signals $SIG_{TX}$ that can be provided wirelessly in one of a plurality of MODCOD schemes. The ACM controller can select a given one of the MODCOD schemes for transmission of each of the transmit signals $SIG_{TX}$ adaptively, as described herein, such as based on dynamic fading of the troposcatter communications channel associated with the transmit signals $SIG_{TX}$. In the example of FIG. 8, the transmit signals $SIG_{TX}$ are transmitted from the ACM transceiver 352 and are scattered from the troposphere to the remote transceiver 354.

The receive SNR, which is determined at the remote transceiver, is reported to the ACM transceiver through the return signal $SIG_{RX}$. In the example of FIG. 8, the return signals $SIG_{RX}$ are transmitted from the remote ACM transceiver 354 and are scattered from the troposphere to the ACM transceiver 352. In response to receiving the transmit signal $SIG_{TX}$, the remote transceiver 354 can determine the SNR of the received transmit signal $SIG_{TX}$ and can transmit a respective return signal $SIG_{RX}$ back to the ACM transceiver 352 to report the determined SNR. Therefore, the ACM transceiver 352 receives the SNR information after a given propagation delay associated with transmission of the transmit signal $SIG_{TX}$ from the ACM transceiver 352 to the remote transceiver and the transmission or the return signal SIG$_{RX}$ from the remote transceiver 354 to the ACM transceiver 352. Accordingly, the reported SNR of the associated transmit signal SIG$_{TX}$ is delivered by the respective corresponding return signal SIG$_{RX}$ that is received at the subsequent time. Therefore, the ACM controller can promptly update an ACM tracking table while accounting for the delay of SNR information and update an adaptive ACM table accordingly, similar to as described previously, to provide adaptive selection of the MODCODS for transmission of the transmit signals SIG$_{TX}$ to compensate for dynamic fading of the atmospheric conditions in the troposcatter channel communications system 350.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An adaptive coding and modulation (ACM) transmission system comprising:
   an ACM controller, the ACM controller being configured to receive a reported signal-to-noise ratio (SNR) via each of a plurality of return signals corresponding to a respective plurality of transmit signals that were each sequentially previously transmitted from an ACM transceiver system in a respective one of a plurality of modulation and coding schemes (MODCODS), the reported SNR via a given one of the plurality of return signals corresponding to the respective one of the plurality of transmit signals, and further configured to continuously generate an adaptive SNR threshold associated with each of the plurality of MODCODS based on the reported SNR delivered by the received plurality of return signals, the ACM controller being further configured to compare the reported SNR with the adaptive SNR threshold of each of the plurality of MODCODS to select one of the plurality of MODCODS for transmission of a next transmit signal; and
   an ACM tracking table comprising a maximum SNR difference value corresponding to a difference between the reported SNR associated with one of the plurality of transmit signals and the reported SNR of another one of the plurality of transmit signals for each of the plurality of MODCODS.

2. The system of claim 1, wherein the ACM controller comprises an adaptive ACM table comprising the adaptive SNR threshold associated with each of the plurality of MODCODS, wherein the ACM controller is configured to continuously modify the adaptive SNR threshold associated with each of the plurality of MODCODS in the adaptive ACM table in response to the reported SNR delivered by each of the received plurality of return signals.

3. The system of claim 2, wherein the ACM controller further comprises:
   an ACM reference table comprising a nominal SNR threshold associated with each of the plurality of MODCODS,
   wherein the ACM controller is configured to continuously modify the adaptive SNR threshold associated with each of the plurality of MODCODS in the adaptive ACM table based on the ACM reference table and the ACM tracking table.

4. The system of claim 3, wherein the maximum SNR difference value corresponds to the reported SNR associated with the one of the plurality of transmit signals and the reported SNR associated with the other one of the plurality of transmit signals that was transmitted at a previous time relative to the one of the plurality of transmit signals for each of the plurality of MODCODS, wherein the previous time corresponds to a round-trip propagation delay of a respective one of the plurality of transmit signals and a corresponding one of the plurality of return signals.

5. The system of claim 3, wherein the ACM controller is configured to set the adaptive SNR threshold as a sum of the nominal SNR threshold and the maximum SNR difference value for each of the plurality of MODCODS.

6. The system of claim 5, wherein the plurality of MODCODS are arranged in the adaptive ACM table as index values in ascending order of adaptive SNR threshold, wherein the ACM controller is further configured to compare the adaptive SNR threshold of each of the plurality of MODCODS in response to setting the adaptive SNR threshold of a given one of the plurality of MODCODS and to overwrite an adaptive SNR threshold with a sum of a minimum SNR increment and the adaptive SNR threshold of a preceding index value in response to the adaptive SNR threshold being less than the sum of a minimum SNR increment and the adaptive SNR threshold of a preceding index value in the adaptive ACM table.

7. The system of claim 3, wherein the ACM controller is configured to adjust the maximum SNR difference value for each of the plurality of MODCODS by a predetermined decay factor in response to receiving each of the plurality return signals.

8. The system of claim 3, wherein the ACM controller is configured to determine an SNR difference value between a first transmit signal of the plurality of transmit signals and a second transmit signal of the plurality of transmit signals for a respective one of the plurality of MODCODS, wherein the ACM controller is configured to compare the SNR difference value with the maximum SNR difference value associated with the respective one of the plurality of MODCODS stored in the ACM tracking table and to overwrite the maximum SNR difference value stored in the ACM tracking table with the SNR difference value in response to the SNR difference value being greater than the maximum SNR difference value.

9. A troposcatter communication system comprising the ACM transceiver system of claim 1.

10. A method for transmitting signals in an adaptive coding and modulation (ACM) transmission system, the method comprising:
    Transmitting, by an ACM transceiver, a first transmit signal in a first modulation and coding scheme (MODCOD) of a plurality of MODCODS;
    Receiving, by the ACM transceiver, a first return signal corresponding to the first transmit signal;
    Receiving, by the ACM transceiver, a reported signal-to-noise ratio (SNR) corresponding to the first transmit signal via the first return signal;

comparing the reported SNR with a plurality of adaptive SNR thresholds in an adaptive ACM table, each of the plurality of adaptive SNR thresholds being associated with a respective one of the plurality of MODCODS, to determine one of the plurality of MODCODS for transmission of a second transmit signal;

transmitting, by the ACM transceiver, the second transmit signal via the determined one of the plurality of MODCODS;

receiving, by the ACM transceiver, a second return signal corresponding to the second transmit signal; and updating the adaptive ACM table based on the reported SNR delivered by the second return signal comprising updating a maximum SNR difference value for each of the plurality of MODCODS in an ACM tracking table, the maximum SNR difference value corresponding to a difference between the reported SNR associated with a first transmit signal and the reported SNR associated with a second transmit signal for the respective one of the plurality of MODCODS.

11. The method of claim 10, wherein updating the adaptive ACM table further comprises:

adding the maximum SNR difference value to a reference SNR threshold in a reference SNR table to calculate the adaptive SNR threshold, the reference SNR threshold corresponding to a nominal SNR threshold associated with each of the plurality of MODCODS.

12. The method of claim 11, wherein the plurality of MODCODS are arranged in the adaptive ACM table as index values in ascending order of adaptive SNR threshold, wherein updating the adaptive ACM table further comprises:

comparing the adaptive SNR threshold of each of the plurality of MODCODS in response to setting the adaptive SNR threshold of a given one of the plurality of MODCODS; and overwriting an adaptive SNR threshold with a sum of a minimum SNR increment and the adaptive SNR threshold of a preceding index value in response to the adaptive SNR threshold being less than the sum of the minimum SNR increment and the adaptive SNR threshold of a preceding index value in the adaptive ACM table.

13. The method of claim 11, wherein updating the maximum SNR difference value comprises adjusting the maximum SNR difference value for each of the plurality of MODCODS by a predetermined decay factor in response to receiving each of the first and second return signals.

14. The method of claim 11, wherein updating the SNR difference value comprises:

determining an SNR difference value between the reported SNR of a third transmit signal and the reported SNR of a fourth transmit signal;

comparing the SNR difference value with the maximum SNR difference value for the associated MODCOD stored in the ACM tracking table; and overwriting the maximum SNR difference value with the SNR difference value in response to the SNR difference value being greater than the maximum SNR difference value.

15. A troposcatter communication system comprising an adaptive coding and modulation (ACM) transmission system, an ACM transceiver system comprising an ACM controller configured to receive a reported signal-to-noise ratio (SNR) delivered by each of a plurality of return signals corresponding to a respective plurality of transmit signals that were each sequentially previously transmitted from the ACM transceiver system in a respective one of a plurality of modulation and coding schemes (MODCODS), the reported SNR delivered by a given one of the plurality of return signals corresponding to the respective one of the plurality of transmit signals, the ACM controller comprising:

an ACM reference table comprising a nominal SNR threshold associated with each of the plurality of MODCODS;

an ACM tracking table comprising a maximum SNR difference value corresponding to a difference between the reported SNR associated with one of the plurality of transmit signals and the reported SNR of another one of the plurality of transmit signals for each of the plurality of MODCODS; and an adaptive ACM table comprising an adaptive SNR threshold associated with each of the plurality of MODCODS, the adaptive SNR threshold comprising a sum of the nominal SNR threshold and the maximum SNR difference value for each of the plurality of MODCODS;

wherein the ACM controller is configured to compare the reported SNR with the adaptive SNR threshold of each of the plurality of MODCODS to select one of the plurality of MODCODS for transmission of a next transmit signal.

16. The system of claim 15, wherein the maximum SNR difference value corresponds to the reported SNR associated with the one of the plurality of transmit signals and the reported SNR associated with the other one of the plurality of transmit signals that was transmitted at a previous time relative to the one of the plurality of transmit signals for each of the plurality of MODCODS, wherein the previous time corresponds to a round-trip propagation delay of a respective one of the plurality of transmit signals and a corresponding one of the plurality of return signals.

17. The system of claim 15, wherein the ACM controller is configured to set the adaptive SNR threshold as a sum of the nominal SNR threshold and the maximum SNR difference value for each of the plurality of MODCODS.

18. The system of claim 17, wherein the plurality of MODCODS are arranged in the adaptive ACM table as index values in ascending order of adaptive SNR threshold, wherein the ACM controller is further configured to compare the adaptive SNR threshold of each of the plurality of MODCODS in response to setting the adaptive SNR threshold of a given one of the plurality of MODCODS and to overwrite an adaptive SNR threshold with a sum of a minimum SNR increment and the adaptive SNR threshold of a preceding index value in response to the adaptive SNR threshold being less than the sum of the minimum SNR increment and the adaptive SNR threshold of the preceding index value in the adaptive ACM table.

19. The system of claim 15, wherein the ACM controller is configured to adjust the maximum SNR difference value for each of the plurality of MODCODS by a predetermined decay factor in response to receiving each of the plurality return signals.

20. The system of claim 15, wherein the ACM controller is configured to determine an SNR difference value associated with the reported SNR of a first transmit signal of the plurality of transmit signals and the reported SNR of a second transmit signal of the plurality of transmit signals and to compare the SNR difference value with the maximum SNR difference value for the associated MODCOD stored in the ACM tracking table and to overwrite the maximum SNR difference value with the SNR difference value in response to the SNR difference value being greater than the maximum SNR difference value.

\* \* \* \* \*